United States Patent [19]

McCornack

[11] 4,361,168
[45] Nov. 30, 1982

[54] FLUSH VALVE CONSTRUCTION

[75] Inventor: Robert R. McCornack, Galesburg, Ill.

[73] Assignee: Safe Automatic Flow Engineering, Inc., Galesburg, Ill.

[21] Appl. No.: 312,628

[22] Filed: Oct. 19, 1981

[51] Int. Cl.³ .................... F16K 43/00; F16K 31/48
[52] U.S. Cl. ........................ 137/315; 137/614.11; 137/614.19; 251/39; 251/51; 251/285
[58] Field of Search .............. 137/218, 315, 329.1, 137/329.2, 329.3, 329.4, 454.6, 614.11, 614.19; 251/39, 50, 51, 53, 120, 121, 205, 285, 321, 322, 323, 324

[56] References Cited

U.S. PATENT DOCUMENTS

| | | | |
|---|---|---|---|
| 1,691,626 | 11/1928 | Cook | 251/321 |
| 2,202,971 | 6/1940 | Vedoe | 251/50 |
| 3,400,731 | 9/1968 | McCornack | 251/39 |
| 3,842,857 | 10/1974 | McCornack | 251/39 |
| 3,965,922 | 6/1976 | McCornack | 137/218 |

Primary Examiner—George L. Walton
Attorney, Agent, or Firm—McDougall, Hersh & Scott

[57] ABSTRACT

A flush valve construction for water closets, urinals, showers and the like including a cylindrical jacket and associated piston assembly. A stop is adapted to be seated in the fluid supply line which will achieve flow adjustment and also render the valve inoperative and thereby permit repairs to the construction. The shaft supporting this stop is threaded and a nut is mounted thereon. This nut is positioned for engagement with the end of the valve piston to thereby control the stroke of the piston. This enables the saving of water by preventing an undue volume of water from passing through the valve during each operating cycle.

4 Claims, 2 Drawing Figures

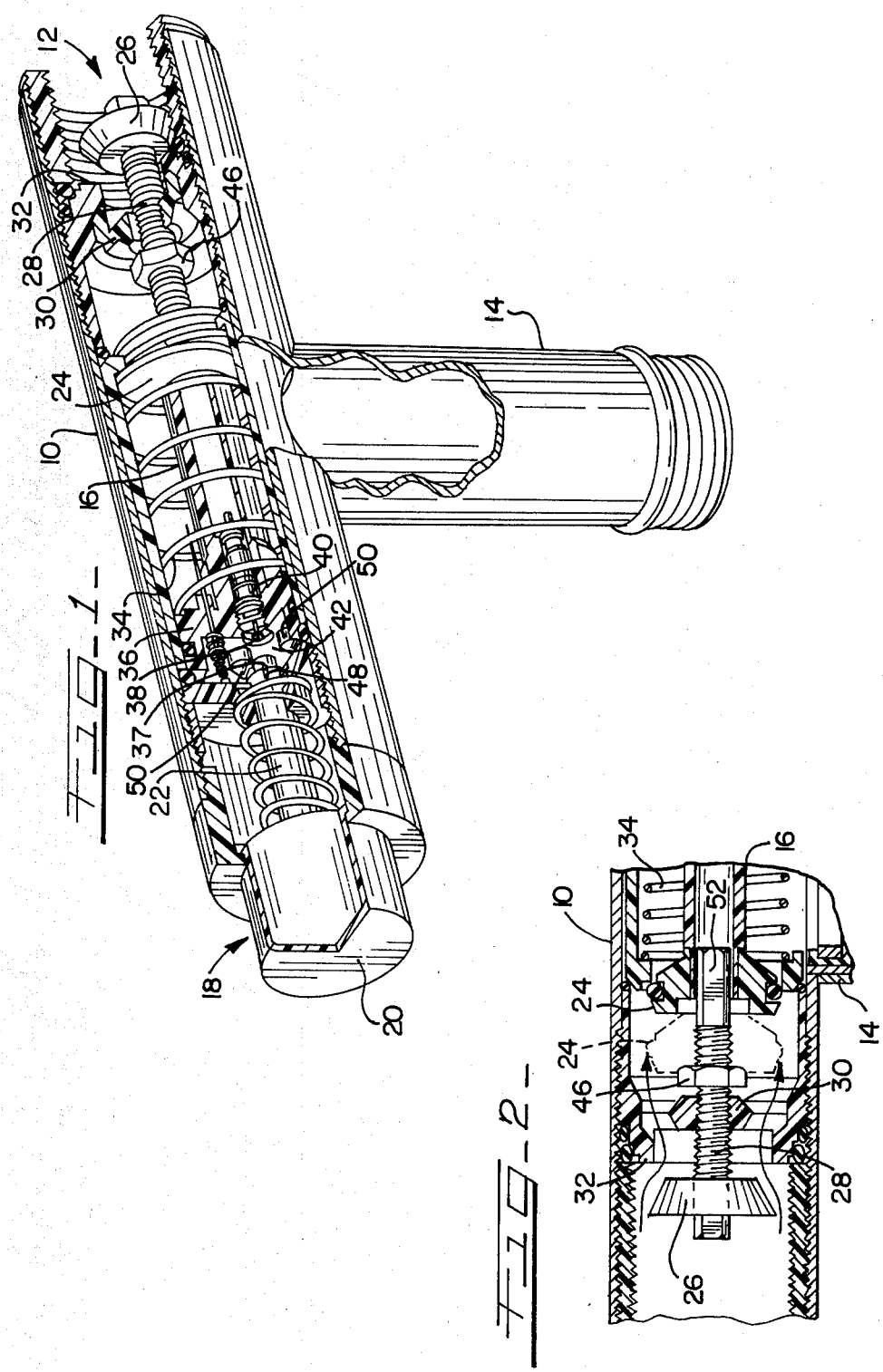

FLUSH VALVE CONSTRUCTION

BACKGROUND OF THE INVENTION

This invention relates to a flush valve construction employed for metering fluids in predetermined quantities. Valves of this type are commonly used for water closets, urinals, showers, slop sinks, and other applications.

Valves of the type relating to this invention are disclosed in applicant's U.S. Pat. No. 3,400,731, issued on Sept. 10, 1968; U.S. Pat. No. 3,842,857, issued on Oct. 22, 1974 and U.S. Pat. No. 3,965,922 issued on June 29, 1976.

In accordance with the latter patent, a construction is provided emphasizing the use of a pin arrangement which is associated with a metering passage for controlling the time interval the valve is in the open position, thereby controlling the amount of fluid passing through the construction. A forward stop is provided to adjust or shut off fluid flow to the device when it is desired, for example, when maintenance is required. Other features disclosed in that patent and the other patents of applicant provide valves characterized by efficient operation.

SUMMARY OF THE INVENTION

This invention includes a cylindrical jacket and associated piston assembly of the type shown in the aforementioned patents. In addition, a forward stop of the type discussed is utilized to provide flow adjustment and shutting off of fluid flow. In accordance with this invention, the stop is mounted on a threaded shaft and a nut is positioned on the shaft. This nut is adjustable but when set in position it controls the permissible degree of movement of the piston which controls the water flow. Therefore, the construction can be set to save water and the use of the nut will prevent each user of the system embodying the construction from using the maximum water each time the valve is depressed.

BRIEF DESCRIPTION OF THE DRAWINGS

FIG. 1 is a perspective, cut-away view illustrating the metering valve construction of the invention; and, FIG. 2 is a fragmentary, sectional view through the flush valve illustrating the stop and adjustable control means of the flush valve piston.

DETAILED DESCRIPTION OF THE INVENTION

This invention generally comprises a valve with an open passage defined by a cylindrical jacket with a piston assembly within for normally closing one end of the passage. An actuating means is employed for displacing the pistion assembly to open access through the jacket whereby fluid can exhaust.

A chamber located within the flush valve communicates with a small valve structure associated with the piston assembly. When activated, this small valve structure permits entry of fluid or gas into the chamber. After the desired directional movement of the piston assembly has been achieved, it is reciprocally urged, by fluid pressure and spring means, toward its original seated position. The interval of return movement is controlled by means of a metering passage communicating with the chamber permitting a predetermined discharge flow of fluid from the chamber whereby the interval during which the valve is unseated is controlled.

More specifically, and referring now to FIG. 1, there is provided a cylindrical jacket 10 which is connected to a source of fluid such as water at the end 12. The fluid exhausts through jacket section 14.

Flush valve piston 16 is sealingly disposed within jacket 10 and a cap assembly 18 having a push button type actuator 20 mounted therein is provided. A rod-type plunger 22 is actuated by operation of the push button 20 for operating the piston 16. A valve construction 24 on the end of piston 16 is adapted to sealingly engage a seat.

Disposed forwardly of the valve is a stop 26. The stop is mounted to a shaft 28 having threads on a portion thereof for movement in a cross member 30. As will be appreciated from FIG. 2, when the stop is in the position illustrated, fluid passes around it to the valve assembly. Alternatively, when it is desired to render the flush valve inoperative and prevent fluid flow therethrough, the stop shaft 28 is adapted to be rotated so that the stop seats against the seat 32.

Fluid passing the open stop 26 next passes actuated valve 24 and exhausts through jacket section 14. A vacuum breaker to prevent possible reverse flow if the fluid supply upstream is exhausted may be located within the section 14.

It will be appreciated that the valve 24 mounted to the piston 16 is normally maintained in the sealing position shown in FIG. 1 due to the effects of a coil spring 34 disposed between the valve and chamber wall 36. An additional force tending to maintain the valve in a seated position is the pressure of the fluid against the valve in its normally closed position.

In order to actuate the valve and move it from its closed position to the open position, the push button 20 is depressed moving the rod 22 inwardly towards the chamber wall 36. A projection 37 of reduced diameter on the end of rod 22 is adapted to actuate valve stem 38 of a valve 40 thereby allowing fluid to enter chamber 42.

A spring 44 is abutted against push button 20 to urge the rod 22 to its fully extended position following actuation whereby the projection 37 is disengaged from the valve stem 38 thus enabling piston 22 to reset. This resetting is accomplished without the need for a stroke adjusting member as described in said U.S. Pat. No. 3,965,922.

In accordance with this invention, stroke adjustment is achieved by utilizing a nut 46 positioned on the threaded section of stop shaft 28. Specifically, and as shown in dotted lines in FIG. 2, when the valve 24 is moved in response to operation of push button 20, the valve will engage the nut 46. Since the shaft 28 supporting the nut is fixed against axial movement, this will limit the travel of the valve to thereby limit the amount of fluid flow.

The provision of nut 46 particularly enables setting of the construction at a desired flow rate when the structure is originally assembled. Thus, the nut 46 can be located depending upon a customer order, and thereafter the nut location will be maintained unless it becomes desirable to adjust this position. Since the nut 46 is relatively inaccessible, adjustment cannot be readily accomplished by an inexperienced person, and therefore when a particular flow rate is desired, it is not a simple matter to make a change.

Changing of the nut position can, however, be achieved after the construction has been installed by first moving the stop 26 into engagement with stop seat 32. The mechanism for accomplishing this is best described in said U.S. Pat. No. 3,965,922 wherein pins 48 attached at the end of shaft 22 are brought into engagement with turning lugs 50 formed on the chamber 42. The end 52 of shaft 28 is non-circular and is fitted within a bore of corresponding cross section defined by the piston 16. Accordingly, when the piston is rotated, the shaft 28 will also rotate to thereby permit seating of the stop 26 against stop seat 32.

Once the stop has been seated, the piston and valve can be pulled out of the jacket and a tool inserted to adjust the position of nut 46 on shaft 28. This arrangement, of course, also permits maintenance of the valve, piston and other parts of the assembly.

Even without adjusting the position of nut 46, some flow adjustment can be achieved by rotating shaft 28 and thus moving stop 26. Thus, it will be appreciated that the closer stop 26 is located relative to seat 32, the more restricted will be the water flow. Any movement of the stop closer to the seat will also move the nut 46 closer to the seated position of valve 24 thereby further limiting the valve stroke and reducing flow.

It wil be understood that various changes and modifications may be made in the construction described which provide the characteristics of the invention without departing from the spirit thereof particularly as defined in the following claims.

That which is claimed is:

1. In a construction for controlling fluid flow through a jacket having a fluid inlet and a fluid outlet, a piston reciprocally movable within said jacket, a valve connected to the piston, a valve seat whereby movement of the piston operates to seat and unseat the valve for controlling passage of fluid between said inlet and outlet, a stop located upstream of said valve, a shaft supporting said stop, a stop seat defined by said jacket adjacent said inlet, and means for adjusting the position of said shaft for thereby seating and unseating said stop to shut off passage of fluid through said jacket independently of said valve, said means for adjusting including a threaded section defined by said shaft, and a threaded bore receiving said threaded section whereby rotation of said shaft moves said stop relative to said stop seat, the improvement comprising an extension of said threaded section of said shaft, a nut supported on said extension of said threaded section, said valve being movable along said shaft between the seated and unseated positions, said nut thereby limiting movement of said valve and piston whereby the amount of fluid flow through the construction can be controlled, and wherein rotation of said shaft also operates to change the position of said nut relative to said valve to thereby change the location where the nut limits movement of the valve with respect to its seated position.

2. A construction in accordance with claim 1 wherein said nut is set in position during assembly of said construction and maintained at said position after installation of the construction.

3. A construction in accordance with claim 2 including means for changing the relative positions on said shaft of said nut and said stop after installation.

4. A construction in accordance with claim 3 wherein said means for changing the relative position of said nut and stop include means for moving said stop into engagement with said stop seat whereby fluid flow will be prevented and said valve and piston can be removed form said jacket to provide access to said nut on said threaded shaft section.

* * * * *